H. L. BRADY.
FISH GRAPPLE.
APPLICATION FILED NOV. 6, 1919.
1,393,076.
Patented Oct. 11, 1921.
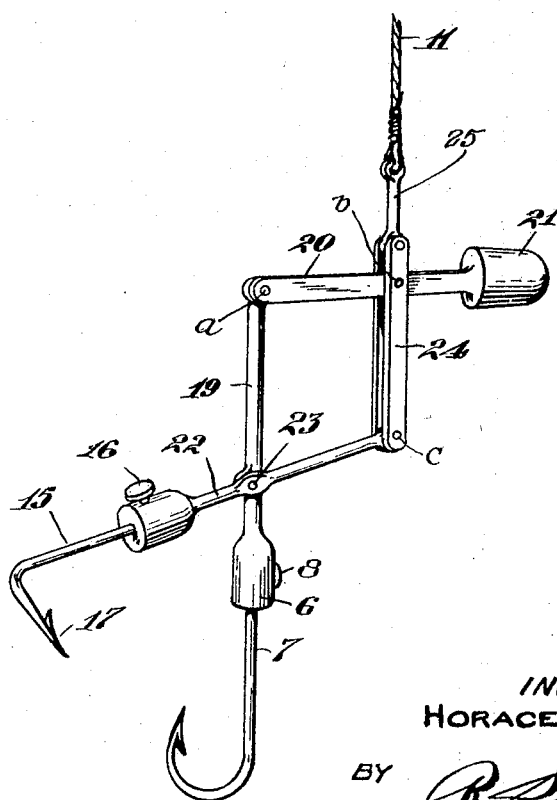
INVENTOR
HORACE L. BRADY;
BY
ATTORNEY.

UNITED STATES PATENT OFFICE.

HORACE L. BRADY, OF LOS ANGELES, CALIFORNIA.

FISH-GRAPPLE.

1,393,076.     Specification of Letters Patent.     Patented Oct. 11, 1921.

Application filed November 6, 1919. Serial No. 336,082.

*To all whom it may concern:*

Be it known that I, HORACE L. BRADY, a citizen of the United States, residing at Los Angeles, in the county of Los Angeles and State of California, have invented new and useful Improvements in Fish-Grapples, of which the following is a specification.

This invention relates to a fish grapple.

It is the object of this invention to provide a device for use in catching fish by hook and line, and to provide means whereby a gaff may be automatically operated to spear a fish nibbling the bait.

Another object is to provide a fish hook with a pivoted gaff so arranged that a slight pull on the hook will cause the gaff to be suddenly advanced toward the hook.

Other objects will appear hereinafter.

The invention is illustrated in the accompanying drawings, in which:

The figure is a perspective view illustrating the invention.

More specifically, 7 indicates a bait hook which is here shown as inserted in a collar 6 and engaged by a set screw 8; the collar 6 being formed on a shank 19 which forms one member of a toggle and to the upper end of which shank is connected by a pivot $a$ a cross bar 20 having a weight 21 on its outer end and which constitutes another member of a toggle. A shank 22 is pivoted at 23 on the shank 19 and forms another link of the toggle which pivotally connects with a supporting bar 24 connected to the cross bar 20 by a pivot pin $b$ and forming the other link of the toggle. The upper end of the supporting bar 24 projects above the bar 20 and is designed to be connected to the line 11. The connection between the bar 24 and the line 11 is here shown as embodying a link 25. A gaff hook having a shank 15 is engaged in a collar on the bar 22 by a set screw 16 and has its end portion turned at an angle to the shank and is formed with a downwardly extending barb 17.

The bar 24 constitutes a pivotal support for the weighted bar 20 which normally extends substantially in a horizontal position transversely of the bar 24, and which in turn forms a support for the shank 19 which normally depends vertically. The bar 22 is carried both by the shank 19 and bar 24 and is normally disposed substantially in a horizontal position; the bar 22 and the bar 24 being connected together by a pivot $c$.

In the operation of the invention on a pull being exerted on the bait hook the shank 19 will move downward and rock the bar 20 in opposition to the weight 21. The downward movement of the shank 19 swings the bar 23 downwardly on its pivotal connection with the bar 24, advances the barb of the gaff hook toward the bait hook in such manner as to spear a fish pulling on the bait hook. On release of the pull on the bait hook the weight 21 will operate to restore the parts to their normal position on suspending the device by the cord 11.

I claim:

A fish grapple comprising a supporting bar attachable at its upper end to a line and normally depending vertically, a rockable bar pivoted adjacent the upper end of said bar and having a weight on the outer end thereof, a depending shank pivoted on the outer end of the rockable bar and depending therefrom, a bait hook carried on the lower end of said shank, a bar pivoted intermediate its ends on said shank and pivoted at its lower end on the lower end of the supporting bar, and a gaff hook carried by said last named bar having a downwardly extending barb, said bars and shank forming collectively a toggle link and the weight operating to normally maintain the toggle link open and the gaff hook elevated.

HORACE L. BRADY.